US 8,693,019 B2

(12) United States Patent
Yanagawa

(10) Patent No.: US 8,693,019 B2
(45) Date of Patent: Apr. 8, 2014

(54) IMAGE FORMATION CONTROL DEVICE, CONTROL METHOD AND RECORDING MEDIUM STORING IMAGE FORMATION CONTROL PROGRAM

(71) Applicant: Brother Kogyo Kabushiki Kaisha, Nagoya (JP)

(72) Inventor: Ryo Yanagawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/850,928

(22) Filed: Mar. 26, 2013

(65) Prior Publication Data
US 2013/0208294 A1    Aug. 15, 2013

Related U.S. Application Data

(62) Division of application No. 13/076,072, filed on Mar. 30, 2011.

(30) Foreign Application Priority Data

Mar. 31, 2010    (JP) ................................. 2010-081541

(51) Int. Cl.
*G06K 15/02*    (2006.01)
(52) U.S. Cl.
USPC .......... 358/1.13; 358/1.15; 358/474; 715/520
(58) Field of Classification Search
USPC .............................. 358/1.13, 1.15
See application file for complete search history.

(56) References Cited

U.S. PATENT DOCUMENTS 5,519,392 A    5/1996    Oder et al.
5,774,362 A    6/1998    Suzuki et al.
(Continued)

FOREIGN PATENT DOCUMENTS

CN    1201184 A    12/1998
CN    101005556 A    7/2007
(Continued)

OTHER PUBLICATIONS

Seiko Epson Corp., "'Using the preview window' of Index.htm included in Epson Web-To-Page Utility v1.1aA," Feb. 1, 2007, available at http://www.epson.jp/dl_soft/readme/5411.htm, Sep. 2, 2010. (Partial translation enclosed.).

(Continued)

*Primary Examiner* — Steven Kau
*Assistant Examiner* — Andrew H Lam
(74) *Attorney, Agent, or Firm* — Baker Botts L.L.P.

(57) ABSTRACT

A control device has a preview image data generating unit, a display unit displaying a preview image, an image formation controlling unit forming an image corresponding to the preview image on a recording sheet, and a user operation detection unit detecting a user operation to make modification in the preview image. The modification in the preview image includes at least one of a change of size of a preview image frame in which the preview image is displayed, a change of an area of the preview image frame, an area of the preview image appeared in the preview image frame. A preview image data modifying unit reflects the user operation detected by the user operation detection unit in the preview image data. The image formation controlling unit forms the image on the recording sheet with reflecting the modification made in the preview image data.

22 Claims, 6 Drawing Sheets

(56) References Cited

U.S. PATENT DOCUMENTS

| | | |
|---|---|---|
| 2009/0214082 A1 | 8/2009 | Hoshi |
| 2009/0237712 A1* | 9/2009 | Shirai .................... 358/1.15 |
| 2009/0256626 A1 | 10/2009 | Hsieh et al. |
| 2009/0265626 A1 | 10/2009 | Suga |
| 2009/0310167 A1* | 12/2009 | Sugimoto ................ 358/1.15 |
| 2010/0103460 A1 | 4/2010 | Murayama et al. |
| 2010/0131903 A1 | 5/2010 | Thomson et al. |
| 2011/0242600 A1 | 10/2011 | Yanagawa |
| 2011/0242601 A1 | 10/2011 | Takahashi |
| 2011/0293199 A1 | 12/2011 | Itakura |

FOREIGN PATENT DOCUMENTS

| | | |
|---|---|---|
| JP | 2003-008866 A | 1/2003 |
| JP | 2009-216842 A | 9/2009 |
| JP | 2009-258966 A | 11/2009 |
| JP | 2009-302916 A | 12/2009 |

OTHER PUBLICATIONS

Canon Corp., "'Preview Screen' of top.htm included in ewpx-win-1_2_1-ea23.exe," available at http://cweb.canon.jp/pixus/pdf/index/nikkeipc.pdf (searched on Jan. 27, 2010). (Partial translation enclosed.).

Canon Information Systems Research Australia Pty. Ltd., "'Easy-WebPrint: Key Features' of product info window," available at http://www.canoneasywebprint.com/jp/, 2007 (searched on Jan. 27, 2010).

Hewlett-Packard Development Co., L.P., "'Automatic fixes:' Enhanced preview and print capabilities of hpsmartprint.chm included in HP_Smart_Web_Print_v4.6.exe," Mar. 2009, available at http://h10025.www1.hp.com/ewfrf/wc/document?Ic=ja&dlc=ja&cc=jp&docname=c01418497 (searched on Jan. 27, 2010). (Partial translation enclosed.).

United States Patent and Trademark Office, Office Action for U.S. Appl. No. 13/076,072 (related U.S. patent application), mailed Mar. 7, 2013.

United States Patent and Trademark Office, Office Action for U.S. Appl. No. 13/076,072 (related U.S. patent application), mailed Oct. 26, 2012.

Japan Patent Office, Notification of Reasons for Rejection for Japanese Patent Application No. 2010-124640 (related to above-captioned patent application), mailed May 14, 2013.

State Intellectual Property Office of the People's Republic of China, Notification of First Office Action for Chinese Patent Application No. 201110085089.2 (counterpart to related patent application), mailed Jun. 28, 2013.

Japan Patent Office, Notification of Reasons for Rejection for Japanese Patent Application No. 2010-081541 (counterpart to above-captioned patent application), mailed Jan. 21, 2014.

Toshiaki Hayashi, "Techniques for Performing Website Printing Efficiently With Economy—Smooth Web-printing in ECO age," PC Japan, Jan. 1, 2010, vol. 15, No. 1, pp. 78-83, SB Creative Corp.

* cited by examiner

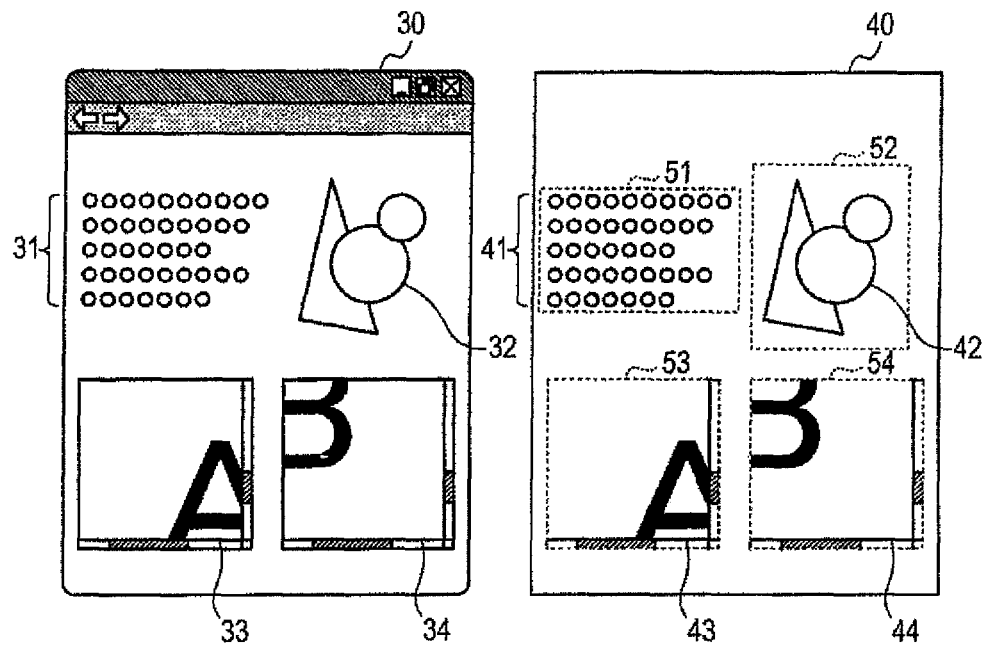
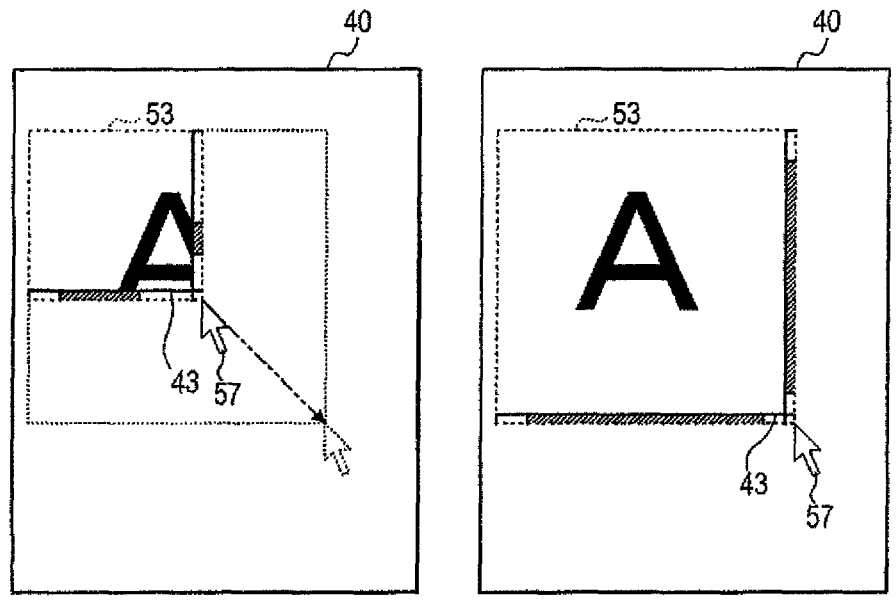
FIG. 4A  FIG. 4B
FIG. 4C  FIG. 4D

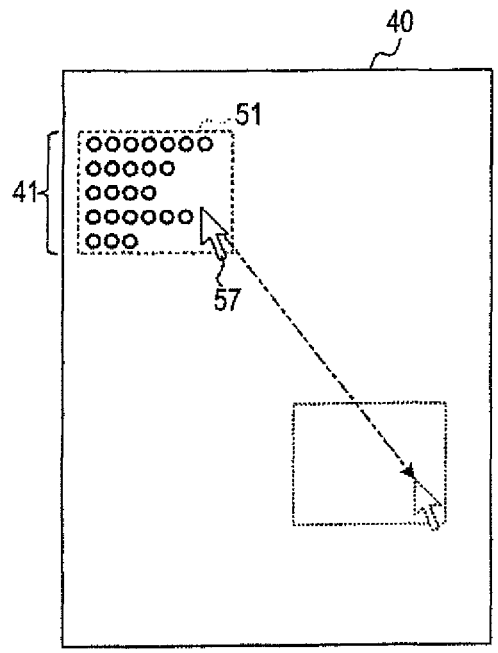
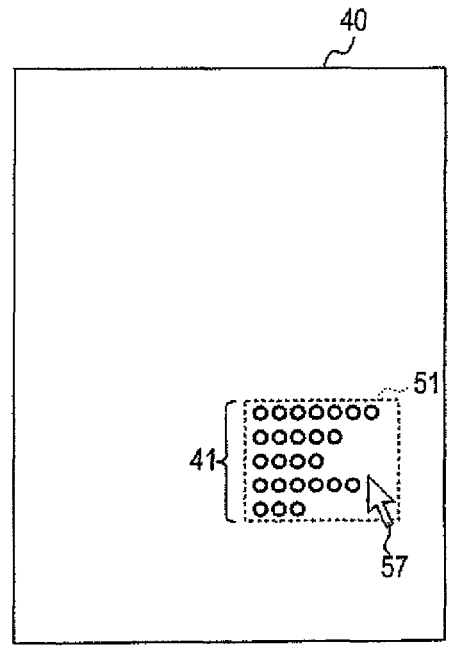
FIG. 6A  FIG. 6B
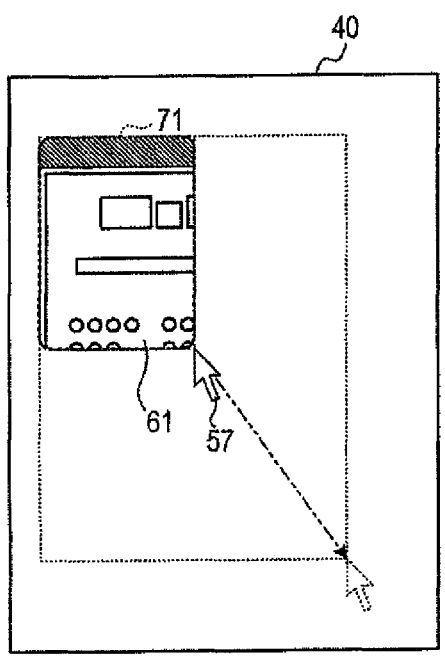
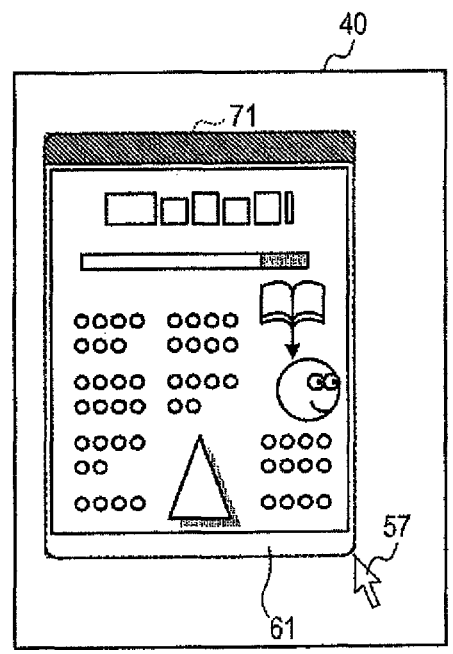
FIG. 6C  FIG. 6D

IMAGE FORMATION CONTROL DEVICE, CONTROL METHOD AND RECORDING MEDIUM STORING IMAGE FORMATION CONTROL PROGRAM

CROSS-REFERENCE TO RELATED APPLICATION

This application is a divisional application of U.S. patent application Ser. No. 13/076,072 filed on Mar. 30, 2011, which claims priority from Japanese Patent Application No. 2010-081541, filed on Mar. 31, 2010. The disclosure of which are incorporated herein by reference in their entirety.

BACKGROUND

1. Technical Field

Aspects of the present invention relate to image formation control device and control method configured to display a preview image and executes an image forming job of forming an image on an output medium such that the image formed on the output medium corresponds to the image displayed in the preview screen. Aspects of the present invention also relate to a computer readable recording medium storing an image formation program that realizes the above function of forming an image as displayed in the preview screen.

2. Related Art

Among web pages, there are ones which are provided with a frame within the web page. When the frame is provided, the user can scroll a displayed image within the frame. Typically, the position of the boundary which defines the frame can be changed.

SUMMARY

If a preview image of such a web page (containing the frame) is created and displayed, the web page may not be represented by the preview image correctly. That is, only a part of the web page may be displayed within the frame and the other area outside the frame may not be displayed in the preview display.

If the web page containing the frame is not shown correctly in the preview display, the user may click the link on the preview image, but cannot scroll the image within the frame or change the boundary of the frame.

Even if the frame is not contained in the web page, or depending on the format and/or contents of the web page, the entire image may not be included in the preview display. There is also a case where the components (e.g., text, images, etc.) constituting the web page may not be included in the preview display completely.

According to the conventional technique, if the preview image of the web page is not completely displayed and adjustment is required, the user cannot adjust the position/size of the components or areas so that they are included in the preview display completely.

According to aspects of the invention, there is provided an image formation control device has a preview image data generating unit, a display unit displaying a preview image, an image formation controlling unit forming an image corresponding to the preview image on a recording sheet, and a user operation detection unit detecting a user operation to make modification in the preview image. The modification in the preview image includes at least one of a change of size of a preview image frame in which the preview image is displayed, a change of an area of the preview image frame, an area of the preview image appeared in the preview image frame. A preview image data modifying unit reflects the user operation detected by the user operation detection unit in the preview image data. The image formation controlling unit forms the image on the recording sheet with reflecting the modification made in the preview image data.

According to aspects of the invention, there is also provided an image formation control device creating print data and preview image data corresponding to the print data, displaying a preview image on a display thereof in accordance with the preview image data. The image formation control device is provided with an image formation data generating unit configured to generate image formation data, based on which the image formation device forms an image, in accordance with markup document data containing component data representing components subjected to the image formation and display, a display data generating unit configured to generate display data, based on which the preview image is displayed on the display area, the preview image representing positions where the components included in the markup document data are arranged on the recording sheet if the image formation device forms the image based on the image formation data that is generated by the image formation data generating unit based on the markup document data, a preview image display control unit configured to control the display device such that the preview image is displayed within a preview display area representing an image formation area of the recording sheet, a user operation detection unit configured to detect whether at least one of user operations to change a size of a target area which is a part of or all the area of the preview image, to change the size of the components arranged within the target area, and to change the position of the target area within the preview display area, a post-modification display data generating unit configured to change at least one of the sizes and positions of the components of which images are formed on the recording sheet when the image formation device formed the image based on the image formation data based on the user operation detected by the user operation detecting unit, and generates post-modification display data used for display the preview image showing the arranged positions of the components on the recording sheet after the modification, a post-modification preview image display controlling unit configured to control the display device to display the post-modification preview image within the preview display area, a post-modification image formation data generation unit configured to control the image formation data generation unit to generate post-modification image formation data, the post-modification image formation data being used by the image formation device so that an image, in which the components are arranged such that sizes and positions of the components of the preview image relative to the preview display area after the modification coincide with the sizes and positions of the components of the image relative to the recording sheet, a post-modification image formation data generation control unit configured to control the image formation data generation unit to generate the post-modification image formation data, the image formation device forming the image in which the components are arranged on the recording sheet, and an image formation device control unit configured to control the image formation device to form an image in accordance with the post-modification image formation data.

According to aspects of the invention, there is also provided a non-transitory computer-accessible recording medium storing a computer program which causes a computer to serve as an image formation control device which may, function as described above.

According to aspects of the invention, there is also provided a method of controlling image formation, which including the steps of generating image formation data, based on which an image formation device forms an image, in accordance with markup document data containing component data representing components for display and image formation, generating display data based on which the preview image is displayed on a display area, the preview image representing positions where the components included in the markup document data are arranged if the image formation device forms the image based on the image formation data that is generated by the step of generating the image formation data, controlling the display device such that the preview image is displayed within a preview display area representing an image formation area of the recording sheet, detecting at least one of user operations to change a size of a target area which is a part of or all the area of the preview image, to change the size of the components arranged within the target area, and to change the position of the target area within the preview display area, changing at least one of the sizes and positions of the components of which images are formed on the recording sheet when the image formation device formed the image based on the image formation data in accordance with the user operation detected by the step of detecting, and generating post-modification display data used for display the preview image showing the arranged positions of the components on the recording sheet after the modification, controlling the display device to display the post-modification preview image within the preview display area generating post-modification image formation data which is used by the image formation device so that an image, in which the components are arranged such that sizes and positions of the components of the preview image relative to the preview display area after the modification coincide with the sizes and positions of the components of the image relative to the recording sheet, controlling the image formation data generation unit to generate the post-modification image formation data, the image formation device forming the image in which the components are arranged on the recording sheet, and controlling unit configured to control the image formation device to form an image in accordance with the post-modification image formation data.

BRIEF DESCRIPTION OF THE ACCOMPANYING DRAWINGS

FIG. 4A illustrates a condition where a web page is displayed on a browser.

FIG. 4B illustrates a condition where a preview image is displayed.

FIG. 4C illustrates a condition before the user changes the frame size.

FIG. 4D illustrates a condition after the user has changed the frame size.

FIG. 6A illustrates a condition where the user changes a print position.

FIG. 6B illustrates a condition where the user has changed the print position.

FIG. 6C illustrates a condition where the user changes a print area.

FIG. 6D illustrates a condition where the user has changed the print area.

DETAILED DESCRIPTION

Hereinafter, an exemplary embodiment according to aspects of the present invention will be described with reference to the accompany drawings.

Figure 1:
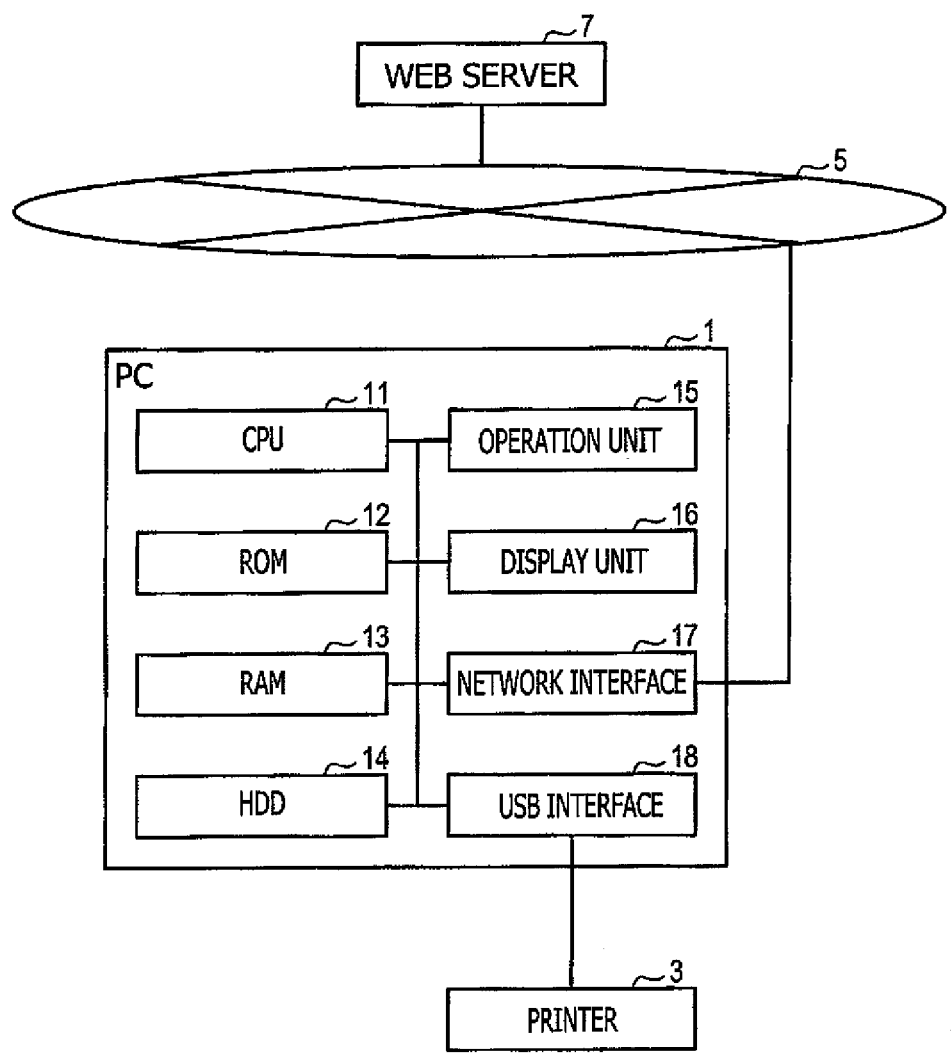
FIG. 1 is a block diagram showing a print system including a PC (Personal Computer) and a printer according to aspects of the invention.

A print system (FIG. 1) includes a personal computer (PC) 1 and a printer 3 connected to the PC 1. The PC 1 is capable of communicating with a web server 7 through a network 5 such as a WAN (Wide Area Network) or the Internet.

The PC 1 is provided with a CPU (Central Processing Unit) 11, a ROM (Read Only Memory) 12, a RAM (Random Access Memory) 13, an HDD (Hard Disk Drive) 14, an operation unit 15, a display unit 16, a network interface 17 and a USB (Universal Serial Bus) interface 18.

On the HDD 14, various kinds of software as well as an OS (Operating System) are stored. A web browser (described later) and plug-ins for the web browser are also stored on the HDD 14. When such programs are executed by the CPU 11, each program is retrieved from the HDD 14 and developed in the RAM 13.

The operation unit 15 includes a keyboard and pointing devices (e.g., a mouse). The display unit 16 has an LCD (Liquid Crystal Display).

A user of the PC 1 can start up the web browser by operating the operation unit 15 to input a predetermined command. When the web browser is started, by operating the operation unit 15, the user can designate a URL (Uniform Resource Locator) to designate markup text data such as HTML (HyperText Markup Language), XHTML (Extensible HTML) or XML (Extensible Markup Language), and a request for such data to the web server 7.

In response to such a request, the web server 7 returns the designated markup text data. The PC 1 receives the thus transmitted markup text data and displays the markup text on the display unit 16. Typically, for displaying the web page based on the markup text data, the text data, the linked image data, configuration data etc. are stored as original data in the RAM 13.

When the markup text is displayed on the display unit 16, if the user inputs a command to print the markup text, through the operation unit 15, the CPU 11 controls the printer 3 to print the markup text.

Before printing the markup text with the printer 3, the user can confirm how the markup text will be printed on an output medium, using a preview function. With the preview function, a preview image is displayed on a preview display area defined on the display unit 16.

According to the embodiment, the web browser is configured such that various functions can be additionally incorporated by installing programs called plug-ins. The preview function, which will be described in detail below, is also realized by a plug-in. The plug-in that realizes the preview function is implemented when the user inputs a preview command by operating the web browser to execute the preview function when, for example, the web page is displayed as shown in FIG. 4A. In response to the preview command, the CPU 11 executes a process shown in FIG. 2.

Figure 2:
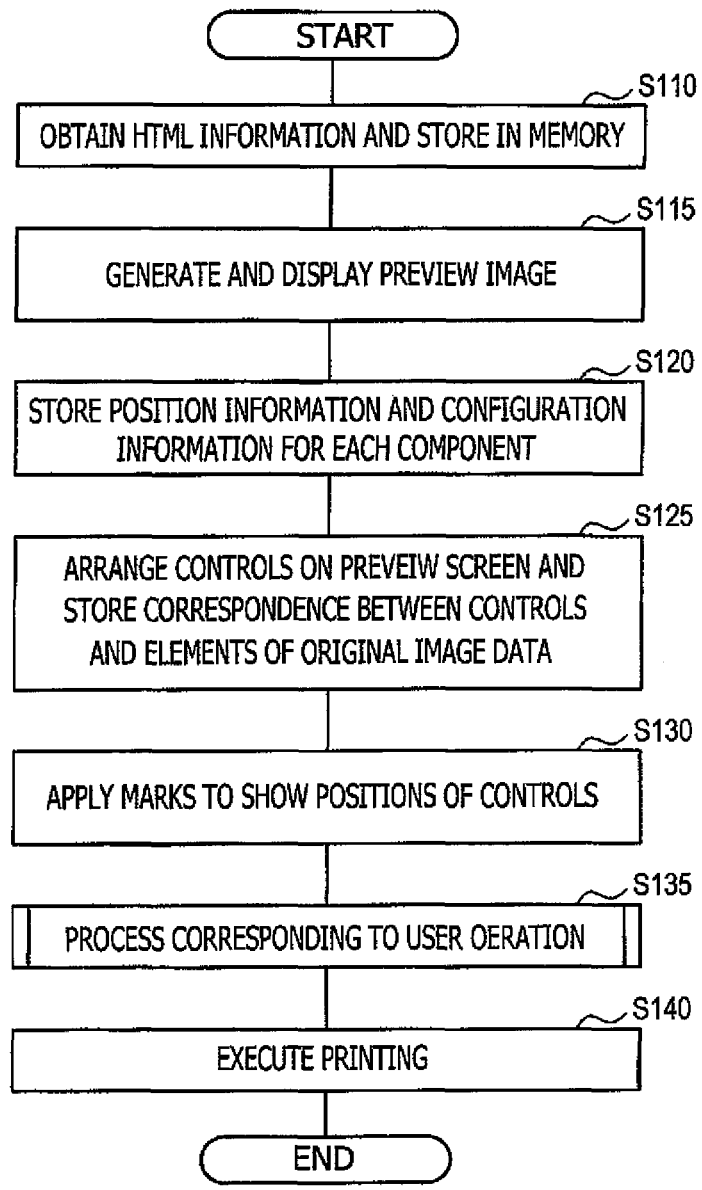
FIG. 2 is a flowchart illustrating a main process of a preview function according to aspects of the invention.

When the print process shown in FIG. 2 is started, the CPU 11 obtains HTML information and stores the obtained HTML information in a memory (e.g., an area in RAM 13) in S110. It should be noted that, at this stage, the browser has already obtained web page data (i.e., mark-up text data) from the server 7 and stored the same in a memory (e.g., an area in RAM 13) for display the web page on the display unit 16. In S110, the HTML information is stored in another memory (e.g., another memory area of the RAM 13) which is different from the memory used by the browser for storing the displayed image. The data stored in another memory in S110 may be the raw data obtained from the web server 7. Alternatively, only data necessary for displaying a preview display may be derived from the raw data obtained from the web server 7 and stored in S110.

Next, the CPU 11 generates a preview image from the HTML information, and displays the same on the preview window (S115). When the CPU 11 generates the preview image from the HTML information, the CPU 11 retrieves the size of the sheet on which the printer 3 prints images, determines the size of the print image mapping area based on the retrieved sheet size, and assigns a print image mapping area inside the memory. Next, the CPU 11 extracts the following components/information from the HTML information:

(a) components (e.g., text, images, frames) subjected to be displayed and printed in the web page (i.e., marked-up document), and position information indicative of positions (arrangement) of the components within the preview screen, and (b) configuration information including format, sizes of the images, etc.

The CPU 11 then maps a preview image in a preview image mapping area such that the components extracted from the HTML information are arranged at respective positions with reflecting the corresponding configuration information.

If no position information or configuration information is associated with a component, the image of the component is mapped base on a balance (relationship) of components around the subjected component. The preview image may be generated further taking the print settings for the printer 3. That is, if a mono-chrome printing is set in the print setting, even if the component represents a color image, a monochromatic image is generated within the preview image mapping area.

It should be noted that the preview image mapping area is a virtual area provided on the memory and managed by an OS (operating system) of the PC 1. When an image is generated in the preview image mapping area, image mapping commands presented by the OS are called so that data corresponding to the image mapping commands are generated (mapped) on the preview image mapping area.

Next, the CPU 11 stores the position data and configuration data for each of the frames, images and character strings in the memory (S120). Then, based on the position data and configuration data stored in the memory, the CPU 11 arranges controls for user operation on the preview image. When the controls are arranged, the CPU 11 makes one-to-one correspondences between the controls and respective components of the original image data, and stores the one-to-one correspondences in the memory (S125). Thereafter, the CPU 11 applies visible marks to the controls so that the user can visually recognize the positions of the controls in the preview image (S130).

Examples of the preview image generated in S115 and the visual marks arranged on the preview image in S130 will be described. In the example shown in FIG. 4A, the web browser displays a text 31, an image 32, a frame 33 and another frame 34 in the web page 30.

When a preview image is generated in S115 and the visual marks are arranged in S130 based on the web page 30, a preview image 40 as shown in FIG. 4B is displayed in the display area 16. In the preview image 40, an image 41 representing the text 31, an image 42 representing the image 32, an image 43 representing the frame 33, and an image 44 representing the frame 34 are included. Further, as visual marks added in S130, frames 51-54 (shown by broken lines) respectively surrounding the images 41-44 are additionally displayed.

In the example shown in FIG. 4B, the frames 51-54 are indicated by broken lines. However, the visual marks need not be limited to the broken lines, but any other visual representation which can be distinguished from each of the images 41-44 can be employed.

For example, the visual marks may include blinking frames, color-reversed frames, frames of which color dynamically changes and/or frames of a particular color. Further, the visual marks need not be limited to the form of a frame, but can be any form other than the frame. For example, a semi-transparent area corresponding to an inner area of a frame, a meshed area corresponding to an inner area of a frame may be employed instead of a frame represented by lines.

As a result of the preview image and visible marks, the user can recognize, by viewing the preview image, how the text 31, image 32, frames 33 and 34 will be arranged when the image is printed using the printer 3.

Further, since the frames 51-54 are displayed in the preview image, it becomes possible to make a user recognize that a user operation concerning each of the text 31, image 32, frames 33 and 34 can be performed.

It should be noted that a portion actually displayed within a displayable area of the frame 33 of the web browser is a part of the component which is described to be displayed in the HTML information. In such a case, there exists a portion which is to be displayed but not displayed, and information concerning such a portion is described in the HTML information. Therefore, in S120, the location information and configuration information of such a non-displayed portion are also extracted from the HTML information, and stored in the memory.

Figure 3:
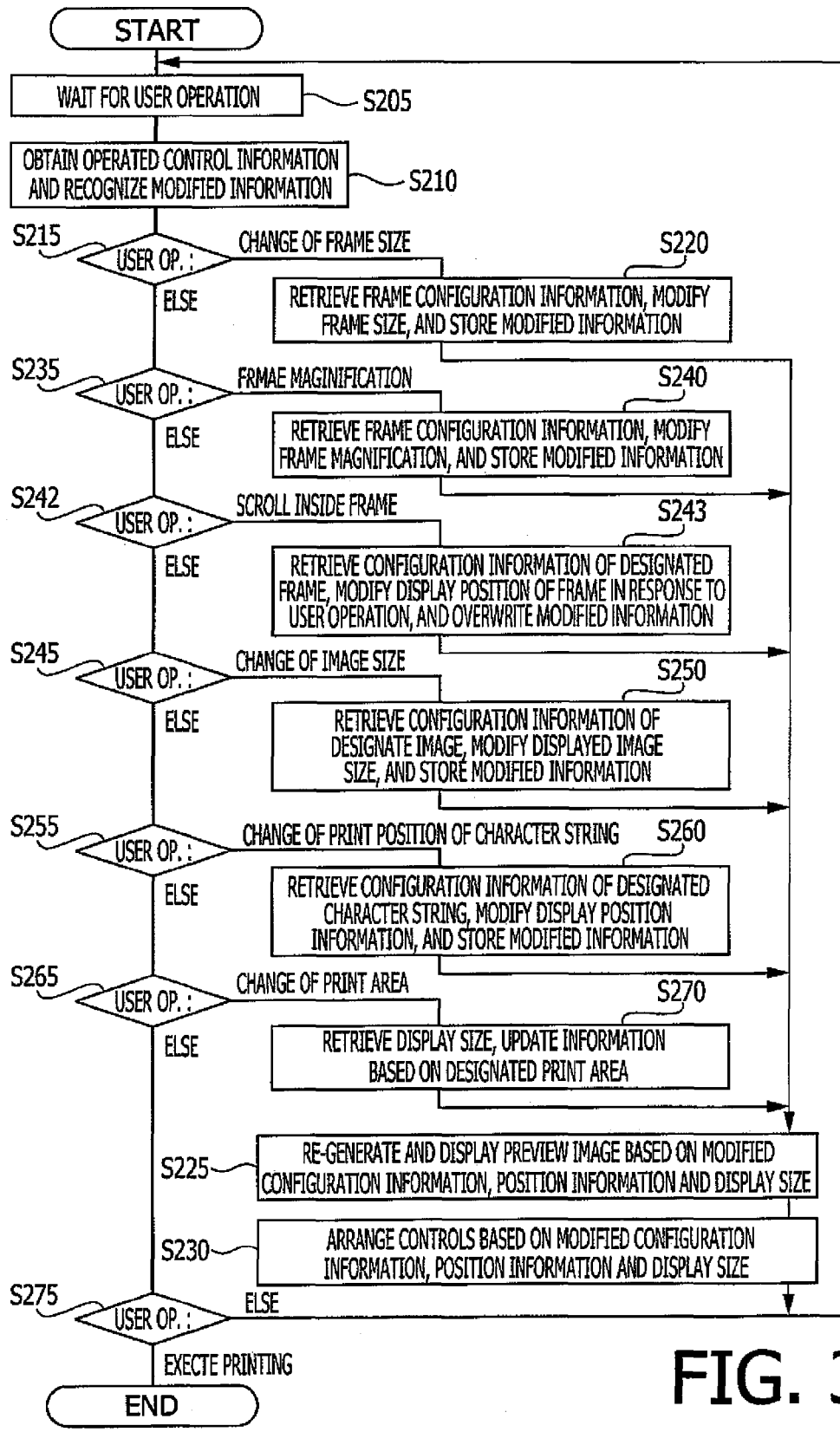
FIG. 3 is a flowchart illustrating a process acquiring a user operation according to aspects of the invention.

After S130, the CPU 11 executes a process corresponding to the user operation (S135). The process corresponding to the user operation will be described with reference to the flowchart shown in FIG. 3. In FIG. 3, the CPU 11 initially waits for a user operation (S205). When a user operation is detected, the CPU 11 obtains information of the control operated by the user, and recognizes the obtained information as modified information of the original image data corresponding to the operated control (S210). Thus, when a control is operated, the CPU 11 modifies the corresponding portion of the original data as well as the corresponding component of the preview image.

Next, the CPU 11 judges whether the user operation represents an instruction to change a frame size (S215). In the embodiment, an operation to change the frame size is to operate a mouse cursor 57 with a pointing device (e.g., a mouse) and drag a side or a corner of the frame 53 to change the size of the frame 53 which is associated with the image 43 representing the frame.

If such an operation to change the size of the frame is executed (S215: User Operation=Frame Size Change), the CPU 11 retrieves the configuration information of the frame designated by the user, changes the frame size, and stores the data by overwriting the updated data over the previous data (S220).

Then, based on the updated configuration information, position information, and display size, the CPU 11 re-composes and re-displays the preview image 40 (S225). It should be noted that, as in S115, the print settings of the printer 3 may be taken into account when the preview image 40 is re-displayed. Further, based on the updated configuration information, position information and display size, a control is also updated and affixed (S230).

In S225, it may happen that components which were not displayed before the update are displayed after the update (i.e., size change). As described above, even for the components which were not displayed before the update, the position information and configuration information thereof have been extracted from the HTML information and stored in the memory. Therefore, when the preview image 40 is re-composed in S225, the CPU 11 is capable of generating images for the components which were not displayed before the update and mapping on the preview image mapping area. Thus, even the images which were not displayed previously can be displayed.

For example, after execution of S225 and S230, the preview image 40 is updated to an image shown in FIG. 4D. In this example, the non-displayed portion, which is out of the frame, in FIG. 4C is shown in FIG. 4D. That is, not by simply expanding or reducing the image shown in FIG. 4C, but by re-drawing the image based on the HTML information, the image is updated as shown in FIG. 4D. After execution of S230, control proceeds to S205.

If the user operation was not for instructing the change of the frame size (S215: ELSE), the CPU 11 judges whether the user operation is for instructing a change of magnification of the frame (S235). In this embodiment, the instruction to change the frame magnification is an operation to point inside of the image 43 representing the frame 43 with the mouse cursor 57, and then rotating the mouse wheel.

If the user operation is to instruct the change of the frame magnification (S235: User Operation=Change of Frame Magnification), the CPU 11 retrieves the configuration information of the frame designated by the user, changes the magnification of the image inside the frame, and stores the updated configuration information by overwriting (S240).

After execution of S240, the control proceeds to S225 where the preview image 40 is re-composed and re-displayed. Then, the control is updated and re-associated (S230).

Figure 5A:
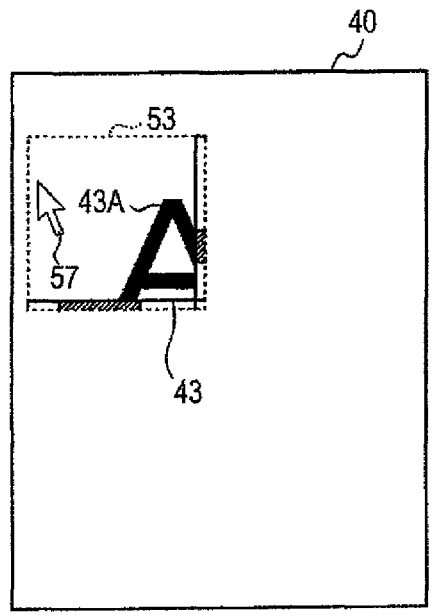
FIG. 5A illustrates a condition before the user changes the frame magnification.
Figure 5B:
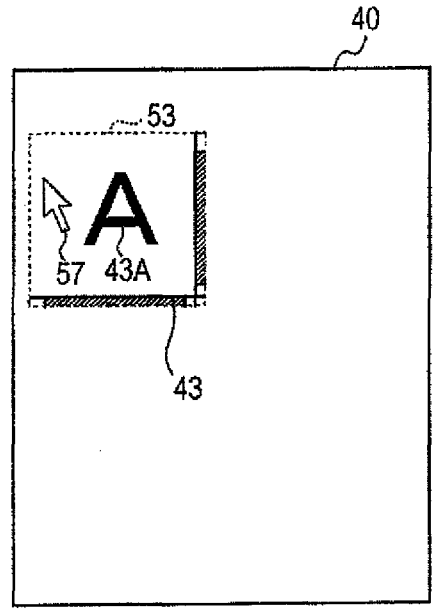
FIG. 5B illustrates a condition after the user has changed the frame magnification.
Figure 5C:
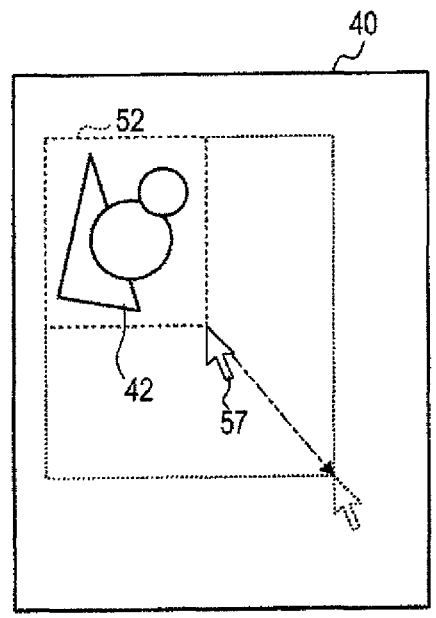
FIG. 5C illustrates a condition where the user changes the image size.

As a result, the preview image 40 is updated to the image as shown in FIG. 5B. A non-displayed portion, which is a portion out of the frame, in FIG. 5A is displayed within the frame in FIG. 5B. After execution S203, the control proceeds to S205.

If the CPU 11 judges that the user operation is not one for instructing the change of the frame magnification (S235: ELSE), the CPU 11 judges whether the user operation is to scroll the image inside the frame (S242). If the user operation is to scroll the image inside the frame (S242: User Operation=Scroll Inside Frame), the CPU 11 retrieves the configuration information of the image designated by the user, applies the scroll of the image (i.e., modify the configuration information to change the position of the image in response to the user operation), and stores the modified information by overwriting (S243).

If the CPU 11 judges that the user operation is not one for scrolling the image inside the frame (S242: ELSE), the CPU 11 judges whether the user operation is to change the image size (S245). In the embodiment, the operation for instructing the change of the image size is an operation of varying an area of the frame 52, which is associated with the image 42.

When the areas defined by the frames 52 and 53 are enlarged (changed), decision in S215 and S245 are affirmative, respectively. It should be noted that the component to which the frame 53 is associated is a frame, while the component to which the frame 52 is associated is an image. Therefore, in S245, such differences are taken into account when the decision is made.

As a result of decision making in S245, if the user operation is to instruct the change of the image size (S245: User Operation=Image size change), the CPU 11 retrieves the configuration information of the image designated by the user, applies the change of the image display size, and stores the same by overwriting (S250).

Figure 5D:
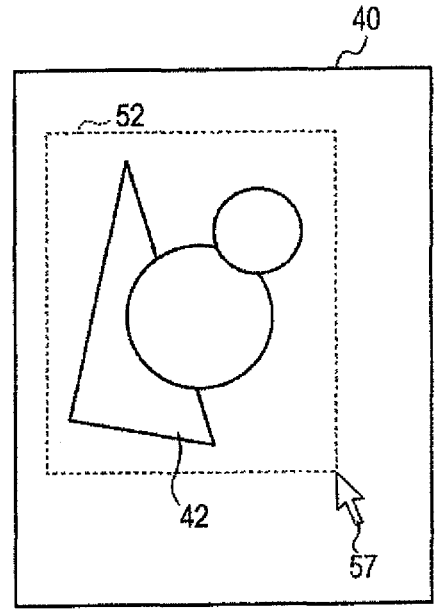
FIG. 5D illustrates a condition where the user has changed the image size.

After execution of S250, the control proceeds to S255, which has already been described, and re-configuration and display of the preview image 40 (S225), update and re-arrange of the controls are executed (S230). As a result, the preview image 40 are updated to be displayed as shown in FIG. 5D, and the image 42 is displayed in an enlarged manner as shown in FIG. 5D. When S230 is completed, the process proceeds to S205.

If the user operation is not one for instructing the change of the image size (S245: ELSE), the CPU 11 judges whether the user operation is one for instructing the change of the position of the character string (S255). In the embodiment, the operation to instruct the position of the character string is an operation to point, with the mouse cursor 57, the inside of the frame 51 which is associated to the image 41 representing the text, and to drag the frame 51.

When such an operation to change the position of the character string (S255: User operation=Change of Character string position), the CPU 11 retrieves the position information of the character string designated by the user from the memory, changes the display position information and stores the updated information by overwriting (S260).

After completing S260, the process proceeds to S225, which has already been described above, and re-composing/displaying of the preview image 40 (S225), updating/re-arranging of the controls (S230) are executed. As a result, the preview image 40 is updated as shown in FIG. 6A and FIG. 6B, in which the image 41 is moved to another position within the preview image 40. After completion of S230, the process returns to S205.

If the user operation is not an instruction to change the print position of the character string (S255: ELSE), the CPU 11 judges whether the user operation is for instructing the change of the print area (S265). In the embodiment, the operation to instruct change of the print area is an operation to vary the area surrounded by the frame 71 associating with the image 61, which represents the entire print area, as shown in FIG. 6C.

If the User Operation is for changing the print area (S265: User Operation=Change of Print Area), the CPU 11 retrieves the image display size stored in the memory, and update the image display size based on the print area designated by the user (S270).

When S270 is completed, the process proceeds to S225, and execute re-composing/displaying the preview image 40 (S225), and updating/re-arranging the controls (S230). As a result, the preview image 40 is updated as shown in FIG. 6D. Thus, the non-displayed portion (i.e., a portion outside the print area) in FIG. 6C is displayed in the print area in FIG. 6D. After completion of S230, the process returns to S205.

If the user operation is not one instructing change of the print area (S265: ELSE), the CPU 11 judges whether the user operation is for instructing execution of print jobs (S275). In the embodiment, the user operation to instruct execution of printing is to click a "PRINT" button (not shown) which is arranged outside the preview image.

If the user operation is not for instructing print execution (S275: ELSE), which means that an undefined user operation has been executed. In such a case, the undefined user operation is ignored, and the control returns to S205. If the user operation is for instructing print execution (S175: User Operation=Print Execution), the CPU 11 finishes the process shown in FIG. 2 and proceeds to S140 of FIG. 2.

In S140, the CPU 11 executes a print job. In S140, the CPU 11 retrieves the size of the sheet on which the printer 3 prints images from the memory, determines the size of the print image mapping area based on the retrieved sheet size, and assigns the print image mapping area having the thus determined size in the memory. Then, an image of the subjected component(s) is mapped on the print image mapping area based on the latest configuration information, position information, size information and the like, which are updated in steps S220, S240, S250, S260 and S270. Then, print data that causes the printer to print the print image mapped in the print image mapping area is created, and transmitted to the printer 3.

As a result, the printer 3 prints the image, which has the same layout, regarding the positions and sizes of the components to be printed, as the preview image, on the output medium (e.g., on a printing sheet).

Print settings for the printer 3 may be reflected when the print data is created in S140, or afterward by the printer 3 or another module therefor. The print settings typically depend on the specification of the printer 3. Such a reflection of the print settings will not be described since they are not directly related to the main part of the embodiment.

As described above, according to the embodiment, when steps S205-S270 are executed, at least one of (a) the size of the subjected area within the preview image, (b) the size of the components arranged within the subjected area, and (c) the position of the subjected area within the preview display area can be changed in accordance with the user operation. Further, when steps S225-S230 are executed, the preview image can be updated to one after modification. Further, when S140 is executed, the image corresponding to the modified preview image can be printed using the printer 3.

Therefore, if the user wishes to make adjustment (and/or modification) to the subjected area within the preview image after reviewing the initially displayed preview image (one displayed upon execution of S115), the adjustment and/or modification can be instructed on the preview image without once completing the display of the preview image.

It should be appreciated that the above-described embodiment is only an exemplary embodiment, and various modifications can be made without departing from the scope of the invention.

For example, in the exemplary embodiment, the programs that causes the PC 1 execute the above processes are implemented as plug-ins. However, the invention needs not be limited to such a configuration, and the browser may have functions to execute such processes. Alternatively, instead of or in addition to an application such as browser, programs incorporated to an OS (e.g., printer driver) may be configured to execute such processes.

In the embodiment, the image formed in the preview image area in S115 is mapped in the print image mapping area (S140). However, the invention needs not be limited to such a configuration, and the print image may be mapped when S115 is executed. Further, if the print image is mapped when S115 is executed, image mapping in the print image mapping area (S140) may be omitted. Alternatively, it may be possible that the print image mapping area is not assigned in S140, and print data for causing the printer to print the image developed in the preview image area may be generated in S140.

Alternatively, in S140, a printer driver having a function of generating print data casing the printer to print an image, a print image mapped in the print image mapping area is inputted to the printer driver so that the printer driver generates the print image and outputs the print data to the printer 3. In such a case, the CPU 11 retrieves the sheet size for printing the image by the printer 3 in S114 or S140 in order to determine the size of the preview image area and/or the print image mapping area.

In the embodiment, each component is arranged in the preview image area or print image mapping area at a position corresponding to the position information, with reflecting the configuration information concerning the component. Instead of such a configuration, the image mapping may be executed without reflecting both or one of the position information and configuration information.

In the exemplary embodiment, the printer 3 is used as an image formation device. However, the invention needs not be limited to one employing the printer. The invention is applicable to any type of the image formation device (e.g., one capable of forming an image on an electronic paper or virtual print device such as a PDF file in a PC).

In the exemplary embodiment, the PC 1 and the printer 3 are employed. The invention needs not be limited to such a configuration. The invention is applicable to an device in which a user interface similar to one employed in the PC 1 is incorporated in a printer which corresponds to the printer 3 in the embodiment.

What is claimed is:

1. A non-transitory computer-readable recording medium storing a computer program, when executed by a computer, causes the computer to function as a control device that performs the steps of:

storing a document written in a markup language in a storage, the document written in the markup language including component data which has at least text data, and configuration information indicating a configuration of components of the document written in the markup language, the configuration of components including respective sizes and positions of the components, the configuration information including size information and position information representing the sizes and the positions of components, respectively;

generating display data indicating a preview image of print data which is generated based on the document written in the markup language and stored in the storage;

displaying the preview image in a preview display area of a display device based on the display data;

receiving a command;

judging whether the received command is a command representing an instruction to change a size of a component arranged in the preview image or a command representing another instruction to change a position of a component arranged in the preview image;

retrieving the configuration information stored in the storage and changing the size of the component based on the received command when the received command is judged to be the command representing the instruction to change the size of the component arranged in the preview image, the size information being updated in response to the change of the size of the component;

retrieving the configuration information stored in the storage and changing the position of the component based on the received command when the received command is judged to be the command representing the instruction to change the position of the component arranged in the preview image, the position information being updated in response to the change of the position of the component; and generating post-modification display data for displaying a post-modification preview on the display device based on the updated size information, the updated position information, and the document stored in the storage, the post-modification preview image representing the preview image in which the size and the position of the component has been updated.

2. The non-transitory computer-readable recording medium according to claim 1, wherein the computer program, when executed by the computer, further causes the control device to perform the steps of:

displaying a control corresponding to the component in the preview image; and displaying a modified control corresponding to the component in the post-modification preview based on the modified one of the size and the position of the configuration information.

3. The non-transitory computer-readable recording medium according to claim 2, wherein the control is arranged in the preview image based on the configuration information of the component, such that a position and a size of the control corresponds to a position and a size of the component; and wherein the control is configured to receive one of a user operation to change a size of the component arranged on the preview image and the user operation to change a position of the component on the recording sheet.

4. The non-transitory computer-readable recording medium according to claim 1, wherein the computer program, when executed by the computer, further causes the control device to perform the steps of:

extracting the configuration information for each of the components from the markup document data; and storing the configuration information by associating each of the components with corresponding configuration information.

5. The non-transitory computer-readable recording medium according to claim 4, wherein the computer program, when executed by the computer, further causes the control device to perform the steps of:

retrieving a corresponding configuration information of the component to which a user operation is detected;

updating the corresponding configuration information of the component based on the detected user operation; and displaying the post-modification preview based on the updated corresponding configuration information of the component.

6. The non-transitory computer-readable recording medium according to claim 1, wherein the computer program, when executed by the computer, further causes the control device to perform the steps of:

generating print data in which the components are arranged such that sizes and positions of the components arranged in the post-modification preview image relative to the preview display area correspond to sizes and positions of the components arranged in the recording sheet relative to an area of the recording sheet; and printing an image comprising the components based on the print data.

7. A method comprising:

storing a document written in a markup language in a storage, the document written in the markup language including component data which has at least text data, and configuration information indicating a configuration of components of the document written in the markup language, the configuration of components including respective sizes and positions of the components, the configuration information including size information and position information representing the sizes and the positions of components, respectively;

generating display data indicating a preview image of print data which is generated based on the document written in the markup language and stored in the storage;

displaying the preview image in a preview display area of a display device based on the display data;

receiving a command;

judging whether the received command is a command representing an instruction to change a size of a component arranged in the preview image or a command representing another instruction to change a position of a component arranged in the preview image;

retrieving the configuration information stored in the storage and changing the size of the component based on the received command when the received command is judged to be the command representing the instruction to change the size of the component arranged in the preview image, the size information being updated in response to the change of the size of the component;

retrieving the configuration information stored in the storage and changing the position of the component based on the received command when the received command is judged to be the command representing the instruction to change the position of the component arranged in the preview image, the position information being updated in response to the change of the position of the component;

generating post-modification display data for displaying a post-modification preview on the display device based on the updated size information, the updated position information, and the document stored in the storage, the post-modification preview image representing the preview image in which the size and the position of the component has been updated.

8. The method of claim 7 further comprising:

displaying a control corresponding to the component in the preview image; and displaying a modified control corresponding to the component in the post-modification preview based on the modified one of the size and the position of the configuration information.

9. The method according to claim 8, wherein the control is arranged in the preview image based on the configuration information of the component, such that a position and a size of the control corresponds to a position and a size of the component; and wherein the control is configured to receive one of a user operation to change a size of the component arranged on the preview image and the user operation to change a position of the component on the recording sheet.

10. The method according to claim 7 further comprising:

extracting the configuration information for each of the components from the markup document data; and storing the configuration information by associating each of the components with corresponding configuration information.

11. The method according to claim 10 further comprising:
retrieving a corresponding configuration information of the component to which a user operation is detected;
updating the corresponding configuration information of the component based on the detected user operation; and
displaying the post-modification preview based on the updated corresponding configuration information of the component.

12. The method according to claim 7 further comprising:
generating print data in which the components are arranged such that sizes and positions of the components arranged in the post-modification preview image relative to the preview display area correspond to sizes and positions of the components arranged in the recording sheet relative to an area of the recording sheet; and
printing an image comprising the components based on the print data.

13. A control device comprising:
a processor; and
a memory storing a computer program, when executed by the processor, causes the control device to perform the steps of:
storing a document written in a markup language in a storage, the document written in the markup language including component data which has at least text data, and configuration information indicating a configuration of components of the document written in the markup language, the configuration of components including respective sizes and positions of the components, the configuration information including size information and position information representing the sizes and the positions of components, respectively;
generating display data indicating a preview image of print data which is generated based on the document written in the markup language and stored in the storage;
displaying the preview image in a preview display area of a display device based on the display data;
receiving a command;
judging whether the received command is a command representing an instruction to change a size of a component arranged in the preview image or a command representing another instruction to change a position of a component arranged in the preview image;
retrieving the configuration information stored in the storage and changing the size of the component based on the received command when the received command is judged to be the command representing the instruction to change the size of the component arranged in the preview image, the size information being updated in response to the change of the size of the component;
retrieving the configuration information stored in the storage and changing the position of the component based on the received command when the received command is judged to be the command representing the instruction to change the position of the component arranged in the preview image, the position information being updated in response to the change of the position of the component; and
generating post-modification display data for displaying a post-modification preview on the display device based on the updated size information, the updated position information, and the document stored in the storage, the post-modification preview image representing the preview image in which one of the size and the position of the component has been modified.

14. The control device of claim 13, wherein the computer program, when executed by the processor, further causes the control device to perform the steps of:
displaying a control corresponding to the component in the preview image; and
displaying a modified control corresponding to the component in the post-modification preview based on the modified one of the size and the position of the configuration information.

15. The control device according to claim 14,
wherein the control is arranged in the preview image based on the configuration information of the component, such that a position and a size of the control corresponds to a position and a size of the component; and
wherein the control is configured to receive one of a user operation to change a size of the component arranged on the preview image and the user operation to change a position of the component on the recording sheet.

16. The control device according to claim 13, wherein the computer program, when executed by the processor, further causes the control device to perform the steps of:
extracting the configuration information for each of the components from the markup document data; and
storing the configuration information by associating each of the components with a corresponding configuration information.

17. The control device according to claim 16, wherein the computer program, when executed by the processor, further causes the control device to perform the steps of:
retrieving a corresponding configuration information of the component to which a user operation is detected;
updating the corresponding configuration information of the component based on the detected user operation; and
displaying the post-modification preview based on the updated corresponding configuration information of the component.

18. The control device according to claim 13, wherein the computer program, when executed by the processor, further causes the control device to perform the steps of:
generating print data in which the components are arranged such that sizes and positions of the components arranged in the post-modification preview image relative to the preview display area correspond to sizes and positions of the components arranged in the recording sheet relative to an area of the recording sheet; and
printing an image comprising the components based on the print data.

19. A non-transitory computer-accessible recording medium storing computer-executable instructions which cause a computer to serve as an image processing device comprising a web browser configured to display a web page based on markup document data, the instructions further causing the computer to perform processes of:
generating display data from the markup document data on which the web page displayed on a display device is based, if an instruction to display a preview image is received when the web browser is displaying the web page within a web page display area of the display device, the display data including component data included in the markup document data and representing a plurality of components arranged in the preview image, a plurality of pieces of size information respectively indicating sizes of the plurality of components, position data indicating positions, within the preview image, of the plurality of components based on a plurality of pieces of position information respectively representing the positions of the plurality of components, and size data indicating size, within the preview image, of each of the plurality of components, the generated display data being stored in a storage;

generating the preview image to be displayed within a preview image area of the display device, in accordance with the display data which has been stored in the storage, the plurality of components being arranged within the preview image at respective positions and in respective sizes based on the position data and the size data included in the display data;

arranging, within the preview image area, a plurality of user-operable controls, arrangement of the plurality of user-operable controls enabling detection of user operations of the plurality of components;

detecting the user operations of the user-operable controls which occur after the plurality of user-operable controls have been arranged within the preview image area;

changing at least one of the position data and the size data included in the display data for a component corresponding to the user operation based on the user operation of the user-operable controls;

updating the preview image in accordance with the changed display data if the at least one of the position data and the size data included in the display data is changed, the preview image being updated such that the at least one of the position and the size of the component corresponding to the user operation has been detected is changed in accordance with the user operation;

arranging the plurality of user-operable controls within the preview image updated in accordance with the changed display data, if the at least one of the position data and the size data included in the display data is changed, arrangement of the user-operable plurality of controls enabling detection of the user operations to the plurality of components including the component of which at least one of the position and size has been changed in accordance with the user operation; and generating the print data based on the display data in response to receipt of a print command, wherein the plurality of components including the component of which at least one of the position and the size has been changed in accordance with the user operation are arranged within a generated print image which is formed based on the print data at positions and in sizes in accordance with the position data and display data which correspond to the plurality of the components, respectively, and are included in the display data.

20. The recording medium according to claim 19, the instructions further causing the computer to perform processes of:

changing the size data included in the display data for the component corresponding to the control, among the plurality of the user-operable controls, for which the user operation has been detected to be applied in accordance with the user operation, if the user operation is detected and the detected user operation is an operation of changing a size of the control; and changing the position data included in the display data for the component corresponding to the control, among the plurality of the user-operable controls, for which the user operation has been detected to be applied in accordance with the user operation, if the user operation is detected and the detected user operation is an operation of changing a position of the control.

21. The recording medium according to claim 20, wherein the plurality of user-operable controls corresponding to the plurality of components are arranged within the preview image at the positions in accordance with the position data of the plurality of components, included in the display data, and in the sizes in accordance with the size data of the plurality of components, and wherein the instructions further cause the computer to perform processes of:

changing the size data included in the display data for the component corresponding to the control, among the plurality of the user-operable controls, for which the user operation has been detected to be applied in accordance with the user operation, if the user operation is detected and the detected user operation is an operation of changing a size of the control by operating a frame of the control; and changing the position data included in the display data for the component corresponding to the control, among the plurality of the user-operable controls, for which the user operation has been detected to be applied in accordance with the user operation, if the user operation is detected and the detected user operation is an operation of changing a position of the control by operating an inside of the control.

22. The recording medium according to claim 19, wherein the plurality of components include a frame component, the frame component being a component which defines an area allowing at least part of one of the plurality of components to be displayed, a size of the area defined by the frame component being changeable by a user operation, a displaying magnification of the one of the plurality of components to be displayed within the area being changeable by a user operation, wherein the display data includes frame size data which indicate the size of the area defined by the frame component and magnification data which indicate the displaying magnification of the one of the plurality of components to be displayed within the area defined by the frame component, and wherein the instructions further cause the computer to perform processes of:

changing the frame size data included in the display data for the one of the plurality of components corresponding to the control for which the user operation has been detected to be applied in accordance with the user operation, if the user operation of the control corresponding to the frame component is detected and the detected user operation is an operation of changing the size of the area defined by the frame component; and changing the displaying magnification data included in the display data for the one of the plurality of components corresponding to the control for which the user operation has been detected to be applied in accordance with the user operation, if the user operation of the control corresponding to the frame component is detected and the detected user operation is an operation of changing the displaying magnification of the image to be displayed within the area.

* * * * *

UNITED STATES PATENT AND TRADEMARK OFFICE
CERTIFICATE OF CORRECTION

PATENT NO. : 8,693,019 B2
APPLICATION NO. : 13/850928
DATED : April 8, 2014
INVENTOR(S) : Ryo Yanagawa It is certified that error appears in the above-identified patent and that said Letters Patent is hereby corrected as shown below:

Title Page, Item (71), Line 1:

Please change "Brother Kogyo Kabushiki Kaisha" to --Ryo Yanagawa--.

Signed and Sealed this
Fifteenth Day of July, 2014

Michelle K. Lee
*Deputy Director of the United States Patent and Trademark Office*